(12) United States Patent
Heindl

(10) Patent No.: US 10,911,892 B2
(45) Date of Patent: Feb. 2, 2021

(54) METHOD FOR DETERMINING THE RELATIVE POSITIONS OF AT LEAST TWO MOBILE TERMINAL DEVICES TO EACH OTHER

(71) Applicant: Lukas Heindl, Gräfelfing (DE)

(72) Inventor: Lukas Heindl, Gräfelfing (DE)

( * ) Notice: Subject to any disclaimer, the term of this patent is extended or adjusted under 35 U.S.C. 154(b) by 0 days.

(21) Appl. No.: 16/042,703

(22) Filed: Jul. 23, 2018

(65) Prior Publication Data

US 2019/0028838 A1   Jan. 24, 2019

(30) Foreign Application Priority Data

Jul. 21, 2017   (DE) .................... 10 2017 006 849

(51) Int. Cl.
| | | |
|---|---|---|
| *H04W 4/02* | (2018.01) | |
| *G01S 5/00* | (2006.01) | |
| *H04W 64/00* | (2009.01) | |
| *G09B 29/10* | (2006.01) | |
| *G01C 21/20* | (2006.01) | |
| *G01C 21/36* | (2006.01) | |
| *G06Q 50/00* | (2012.01) | |

(52) U.S. Cl.
CPC ............ *H04W 4/023* (2013.01); *G01C 21/20* (2013.01); *G01C 21/3632* (2013.01); *G01S 5/0072* (2013.01); *G09B 29/10* (2013.01); *H04W 64/003* (2013.01); *G06Q 50/01* (2013.01)

(58) Field of Classification Search
CPC ........ G01S 5/0072; G01S 5/00; H04W 4/023; H04W 64/003; H04W 4/02; H04W 64/00; G01C 21/20; G01C 21/3632; G01C 5/00; G09B 29/10; G06Q 50/01
See application file for complete search history.

(56) References Cited

U.S. PATENT DOCUMENTS

| | | | | |
|---|---|---|---|---|
| 6,246,376 B1 * | 6/2001 | Bork | ....................... | G01S 1/047 342/357.34 |
| 6,810,323 B1 * | 10/2004 | Bullock | ............... | G08G 1/0969 340/991 |
| 9,736,618 B1 * | 8/2017 | Haney | ...................... | H04W 4/21 |
| 10,451,719 B2 * | 10/2019 | Celinski | .............. | H04L 65/4069 |
| 2002/0011941 A1 * | 1/2002 | Endo | ................... | G01C 21/3635 340/995.1 |
| 2003/0052797 A1 * | 3/2003 | Rock | ................... | G01C 21/3697 340/936 |

(Continued)

*Primary Examiner* — Nathan S Taylor
(74) *Attorney, Agent, or Firm* — Meunier Carlin & Curfman LLC

(57) ABSTRACT

The invention relates to a method for determining the relative positions to each other of at least two mobile terminal devices, such as mobile phones, tablet computers, PDAs, notebooks, subnotebooks, or similar mobile terminal devices, wherein a position query of one mobile terminal device is transmitted to the other mobile terminal device, the relative positions to each other of the two mobile terminal devices are determined on the basis of the current geographic positions of the two mobile terminal devices after the queried mobile terminal device confirms the position query, and a relative distance and a geographic direction to the queried mobile terminal device are displayed at least at the querying mobile terminal device as a position indicator.

12 Claims, 3 Drawing Sheets

(56) References Cited

U.S. PATENT DOCUMENTS

| | | | |
|---|---|---|---|
| 2004/0033808 A1* | 2/2004 | Rorabaugh | G01S 5/0289 455/456.1 |
| 2004/0203380 A1* | 10/2004 | Hamdi | G01S 5/0289 455/41.2 |
| 2004/0204845 A1* | 10/2004 | Wong | G01C 21/3694 701/431 |
| 2006/0009240 A1* | 1/2006 | Katz | G01S 5/0289 455/457 |
| 2007/0129890 A1* | 6/2007 | Yang | G01S 5/0072 701/300 |
| 2007/0149208 A1* | 6/2007 | Syrbe | G01S 5/0205 455/456.1 |
| 2007/0197229 A1* | 8/2007 | Kalliola | H04W 4/029 455/456.1 |
| 2009/0221298 A1* | 9/2009 | Hanner | G01C 21/08 455/456.1 |
| 2011/0244881 A1* | 10/2011 | Bando | G01S 5/0072 455/456.1 |
| 2011/0270519 A1* | 11/2011 | Park | G01C 21/12 701/533 |
| 2013/0045759 A1* | 2/2013 | Smith | G04W 4/029 455/456.6 |
| 2014/0004797 A1* | 1/2014 | Vonog | H04B 7/26 455/41.2 |
| 2014/0206382 A1* | 7/2014 | Shabtay | G01S 5/0284 455/456.1 |
| 2014/0210616 A1* | 7/2014 | Ramachandran | G08B 21/0227 340/539.13 |
| 2016/0007160 A1* | 1/2016 | Wan | G01S 5/0072 701/300 |
| 2016/0021155 A1* | 1/2016 | Sawato | G06F 3/04817 455/456.1 |
| 2016/0330584 A1* | 11/2016 | Akpinar | G01S 5/02 |
| 2018/0081026 A1* | 3/2018 | Baratz | G01S 1/08 |
| 2019/0025416 A1* | 1/2019 | Celinski | G01S 11/06 |
| 2020/0128506 A1* | 4/2020 | Zhang | H04W 64/006 |

* cited by examiner

METHOD FOR DETERMINING THE RELATIVE POSITIONS OF AT LEAST TWO MOBILE TERMINAL DEVICES TO EACH OTHER

FIELD OF THE DISCLOSURE

The invention relates to a method for determining the relative positions to each other of at least two mobile terminal devices, such as mobile telephones, tablet computers, PDAs, notebooks, subnotebooks, and similar mobile terminal devices.

BACKGROUND OF THE DISCLOSURE

A common problem is that persons in confusing or unfamiliar locations or outdoors have arranged to meet and, despite modern means of communication, do not find each other for a long time, or even miss each other.

Typically the persons who have arranged to meet attempt to communicate with each other by means of mobile terminal devices, such as mobile phones, tablet computers, PDAs, notebooks, subnotebooks, and similar mobile terminal devices, for example by means of telephony, text messaging, or comparable messaging services, in order to guide each other to an agreed meeting point.

SUMMARY OF THE DISCLOSURE

The object of the invention is to disclose a method for determining the relative position of at least two mobile terminal devices to each other, by means of which the users can be provided in a simple manner with the relative distance between the users and the geographic direction as a position indicator.

The object is achieved according to the invention by means of a method wherein a position query of one mobile terminal device is transmitted to the other mobile terminal device for determining the relative positions of at least two mobile terminal devices to each other, the relative positions of the two mobile terminal devices to each other are determined on the basis of the current geographic positions of the two mobile terminal devices after the position query is confirmed by the other mobile terminal device, and a relative distance and geographic direction to the queried mobile terminal device is displayed as a position indicator at least at the querying mobile terminal device.

By means of the method according to the invention, the user is very specifically informed, in a simple and elegant manner by means of the user's mobile terminal device, in what direction the user must move and how far the distance is from the user to the person queried by the terminal device.

DETAILED DESCRIPTION OF THE EMBODIMENTS

Overview

To this end, the invention proposes that the user first sends a query by means of the user's terminal device to the terminal device of the other user. If the user of the other, queried mobile terminal device allows the position query, then the current geographic positions of the two terminal devices are determined and the relative positions of the two terminal device to each other are determined on the basis of said current geographic positions. The term "relative positions" in the present case is understood to mean data, such as geographic coordinates, allowing unambiguous spatial correlation of the two terminal devices to each other. Based on said relative positions, a relative distance of the querying terminal device to the queried terminal device and a geographic direction, for example in the form of a compass heading, in the form of a compass needle or the like, is displayed as a position indicator on the querying terminal device by a software program stored on the terminal device or by a third-party provider, database, or the like. The user of the querying terminal device can then follow the displayed position indicator.

In order to be able to guide the querying user as precisely as possible, the relative positions of the terminal devices to each other are determined again at regular or irregular intervals of time and displayed on the terminal device as updated position indicators. Alternatively or additionally, the user can optionally request an update of the position indicators by means of the terminal device.

As soon as the relative positions of the terminal devices are at least approximately identical, the method is concluded and corresponding information is displayed on the terminal device.

If the other user declines the position query, then the communication ends. Note that the declining can be actively performed by the user when queried. Alternatively, however, the user can also specify, for example depending on the time or person, in the terminal device or also in a central database, when or in response to whom a position query is declined. Further advantages of the invention are found in the following description, the subclaims, and the drawings.

According to a particularly preferred variant, the method according to the invention can also be used for determining the positions of a plurality of mobile terminal devices. To this end, the invention proposes that the two mobile terminal devices are captured in a database as a common communications group with at least one further mobile terminal device. The user of the querying mobile terminal device then selects one or more mobile terminal devices from the communications group for simultaneously transmitting position queries. After the position queries are transmitted to all selected mobile terminal devices, the relative positions of each confirming terminal device and the querying mobile terminal device to each other are indicated as relative distances and geographic directions at the querying device for those terminal devices for which the user thereof confirms the position query.

By forming a communications group, it is possible to define in advance the circle of users to be queried, so that position queries are transmitted only to members of the communications group. The communications group can thereby be defined individually for a particular event, such as a concert visit. It is also conceivable, however, to define the communications group for a longer period of time, for example in the sense of a group of friends or acquaintances, or in order to use the method according to the invention for recurring events having the same participants, for example.

A particularly advantageous refinement of the method according to the invention proposes that, based on the relative positions of the mobile terminal devices to each other, a position indicator in the form of a relative distance and an opposite geographic distance to the querying mobile terminal device is also displayed at each queried mobile terminal device.

This particularly advantageous when a plurality of persons is included in a common communications group and the querying user remains at the same geographic position, while the other queried users are guide to the querying user by the position indicators displayed on each of the terminal devices.

It is further advantageous if the relative distances and geographic direction of all mobile terminal devices participating in the position query are displayed at each mobile terminal device participating in the position query for which the user thereof has confirmed the query, based on the current geographic positions of each of the mobile terminal devices participating the position query. In other words, each terminal device participating the position query receives position indicators for all of the other participating terminal devices. In this manner, it is possible for the users to be guided toward each other in a coordinated manner and to meet at a common meeting point. It is thereby particularly advantageous if the position indicators are continuously updated.

The method according to the invention preferably makes use of the existing mobile communications network. It is thus proposed that the position query of the querying mobile terminal devices is transmitted to the queried mobile terminal device via the mobile communications network. It is also alternatively possible to transmit the position query and optionally also the position indicators via the Internet, for example by means of existing wireless local area networks (WLANs).

The current geographic positions of the mobile terminal devices participating in the position query are preferably determined by means of a GPS system or by means of the mobile communications cells of a mobile communications network operator. Particularly at outdoor events such as open-air concerts, determining the geographic positions by mean of the GPS system is particularly suitable, because it is thereby possible to relatively precisely determine the positions in a simple manner. Current mobile terminal devices are further typically equipped with GPS receivers, so that this function need merely be activated in the terminal devices. The geographic positions can then be used directly by a software program stored in the terminal devices. Alternatively, the relative positions of the terminal devices to each other can be determined in a database and/or by a third-party provider.

Particularly when a plurality of mobile terminal devices communicates with each other, it is advantageous if the terminal devices exchange the necessary data with each other by means of a common communications point. To this end, it is further proposed by the method according to the invention that the current geographic positions of the mobile terminal devices are transmitted to a database, in which the relative positions are determined by algorithmic calculation, for example, on the basis of the current geographic positions of the terminal devices, and the relative positions are transmitted to the querying mobile terminal device and optionally to the at least one queried mobile terminal device.

Alternatively or in addition, it is also possible to transmit the current geographic position of each of the mobile terminal devices participating in the position query, for which the users thereof have confirmed the query, directly to the querying mobile terminal device, wherein the processor of the querying mobile terminal device then calculates the relative positions of each of the mobile terminal devices participating in the position query on the basis of the current geographic positions by means of a software program, and displays on the querying device the relative distance and geographic direction of each of the mobile terminal devices participating in the position query. Because corresponding software is save in the processor, the use of databases can optionally be eliminated.

In order to ensure a certain level of privacy, in a particularly preferred variant of the method according to the invention it is proposed that the position query of another user can be declined by the user of the queried mobile terminal device. Said active declining is particularly advantageous if the queried user does not wish to make contact. Said declining of position queries can optionally also be permanently specified for particular persons and/or periods of time and can be save in the terminal device and/or in the database.

For a particularly preferred embodiment of the method according to the invention, it is proposed that the terminal devices of all users of the method be included in at least one database together with each individual, user-related database associated with each terminal device. To this end, each user must create a user account in the database, in which the user must or can save the communications data thereof, such as the mobile phone number, as well as individual, personal data. It is critical that it is possible to unambiguously determine the position of the terminal device by means of the data saved in the user account.

The terminal devices and/or the users are associated with individual communications groups in the database, formed by the users themselves and/or by the operator of the database, wherein position queries are permitted only within the communications group.

According to the present variant of the method according to the invention, the users of the common communications group are preferably displayed for selection on each terminal device of each user of a common communications group at the beginning of the position query. The displaying for selection of the users of the common communications group can take place in the form of a listed to be browsed, for example, wherein additional information, such as the name or a picture of the user, is displayed. It is further conceivable that the listing displays which users are available and/or which users desire or decline a position request.

The user then selects the querying terminal devices and/or users from the displayed communications group. After selecting, preferably by means of a one-time trigger, a position query is transmitted to all selected terminal devices to be queried.

It is further proposed that, in addition to the position query, a communications function is provided, by means of which the terminal devices preferably included in a common communications group in the database can communicate with each other for transferring information, text messages, image files, sound files, and/or video files. The users of a communications group can thereby optionally also communicate (chat) with each other and exchange news with each other without querying positions. The additional communications function, however, also provides third-party providers or the database operator the ability to address and to inform the users of the terminal devices specifically.

The method according to the invention can, if desired, also be limited to terminal devices associated with a communications group of terminal devices in the database, and for which position queries are permitted only within the communications group. In such a case, it is particularly advantageous if a further terminal device can be associated with the communications group only upon invitation by at least one user, optionally also only upon approval by the other users of the terminal devices included in the communications group.

The invention is described in greater detail below using two embodiment examples and referencing the drawing. Shown are:

SYSTEM DESCRIPTION

Figure 1:
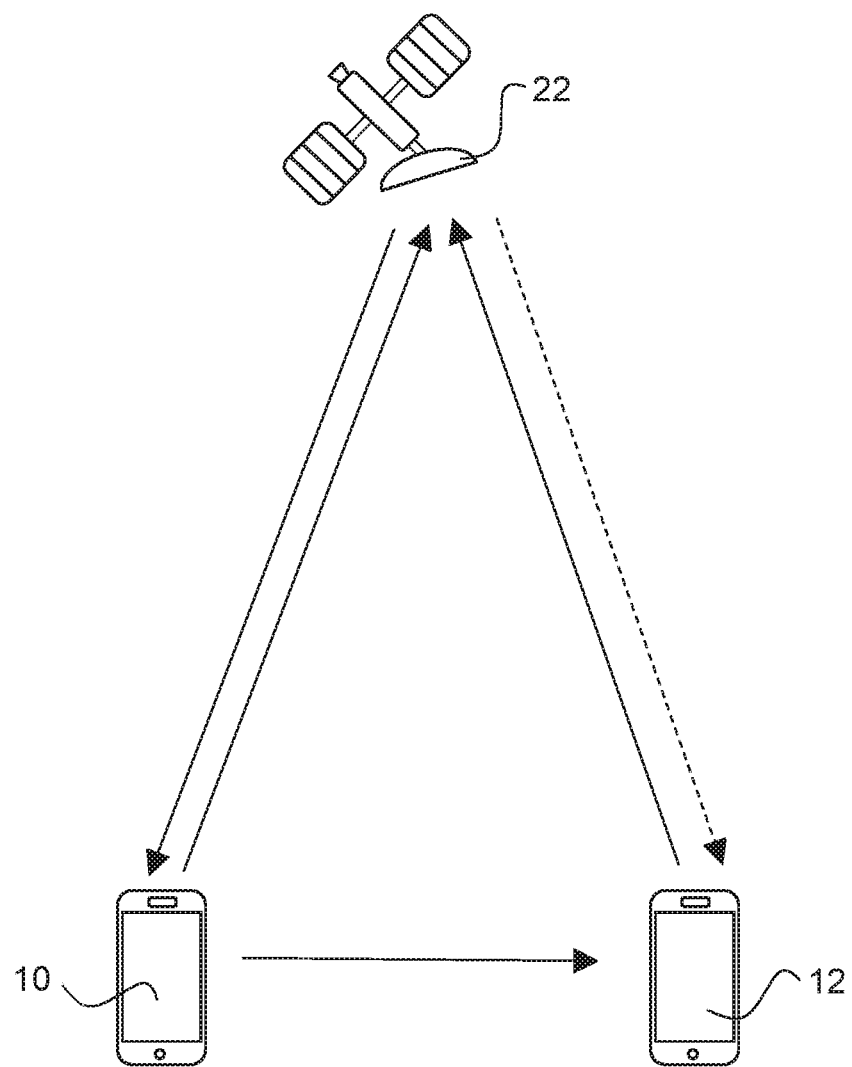
FIG. 1 A schematic view of two mobile terminal devices, the relative positions thereof to each other being determined by means of a satellite using a first variant of the method according to the invention, FIG. 2 An enlarged view of one of the two mobile terminal devices from FIG. 1, position indicators being displayed on the touchscreen thereof, and FIG. 3 A schematic view of three mobile terminal devices, the position indicators of which are determined by means of a database using a second variant of the method according to the invention.

FIG. 1 shows a schematic view of two mobile terminal devices 10 and 12, for example two so-called smartphones. The two terminal devices 10 and 12 communicate with each other in a conventional manner by means of the mobile communications network, not shown in further detail.

Both terminal devices 10 and 12 are equipped with a software program working according to a first variant of the method according to the invention.

Figure 2:
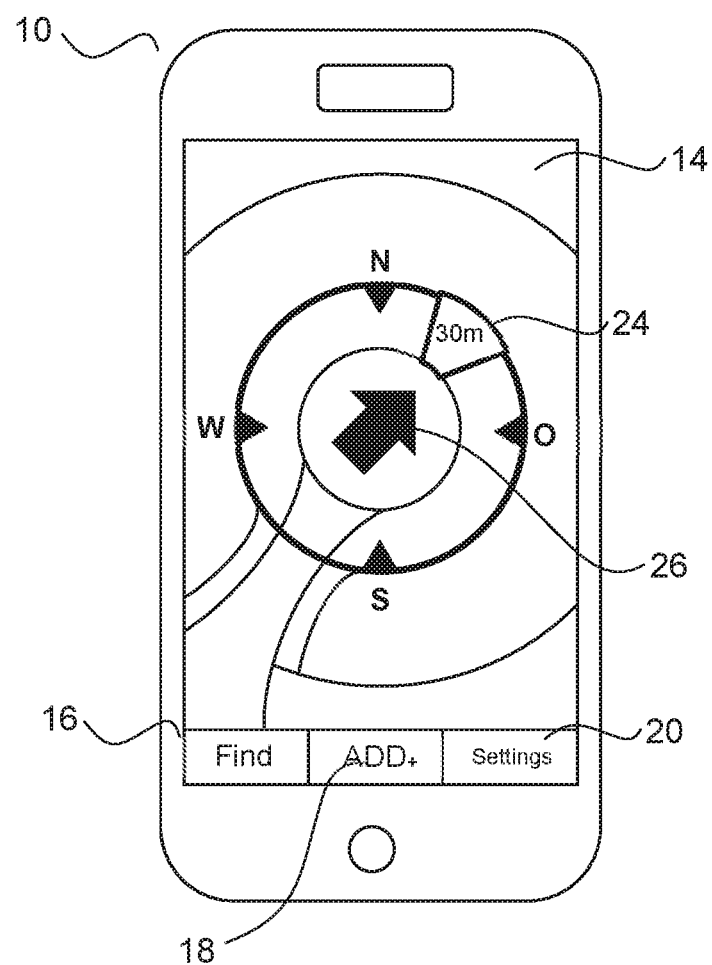

FIG. 2 shows the front side of the terminal device 10 equipped with a touchscreen. The lower region of the touchscreen 14 displays a plurality of buttons 16, 18, and 20, labeled with various labels "Find", "ADD+", and "Settings".

The user of the terminal device 10 uses the terminal device 10 to send a specific position query to the terminal device 12 of the other user. This is done by actuating the button 16 labeled "Find" on the touchscreen 14 of the terminal device 10. As soon as the user activates the button 16 "Find", a list not shown in further details opens, in which all active communications groups in which the user is included as a member are displayed. After selecting a communications group, a further list opens in which all participants of the communications group are displayed. The user can then select the participants to which the user wishes to send a position query.

After selecting, the terminal device 10 sends a position query to all previously selected terminal devices when activated by the user. In the present case, the user has selected only the terminal device 12.

The terminal device 12 had previously been set up in the "Settings" so that position queries from the terminal device 10 are always accepted.

As soon as the position query from the terminal device 10 is received by the terminal device 12, and the GPS function in the terminal device 12 is activated, the terminal device 12 transmits to the terminal device 10 the geographic position of the terminal device 12 transmitted by a satellite 22. The GPS function can optionally also be activated automatically as soon as a position query is received by the terminal device 12.

The terminal device 10, the GPS function of which is also activated, receives the current geographic position transmitted from the terminal device 12. The current geographic position of the terminal device 12 is compared by the processor of the terminal device 10 with the current geographic position of the same, and the relative positions of the two terminal devices 10 and 12 to each other are determined.

In the next step, the terminal device 10 displays on the touchscreen 14 thereof in a distance field 24 a distance value from the other terminal device 12, and displays in a stylized compass rose a directional arrow 26 for indicating the compass heading in which the terminal device 12 is located.

The position indicator displayed on the touchscreen 14 are then updated at regular time intervals, so that the user of the terminal device 10 can follow the updated position indicators.

In a refinement, not shown in further detail, of the present first variant of the method according to the invention, the current geographic position of the querying terminal device 10 is also transmitted reciprocally to the queried terminal device 12, the processor of which in turn calculates position indicators using the current geographic positions of the two terminal devices 10 and 12 and displays said position indicators in the same form of a relative distance and a compass heading on the touchscreen 14 of the queried terminal device 12.

Figure 3:
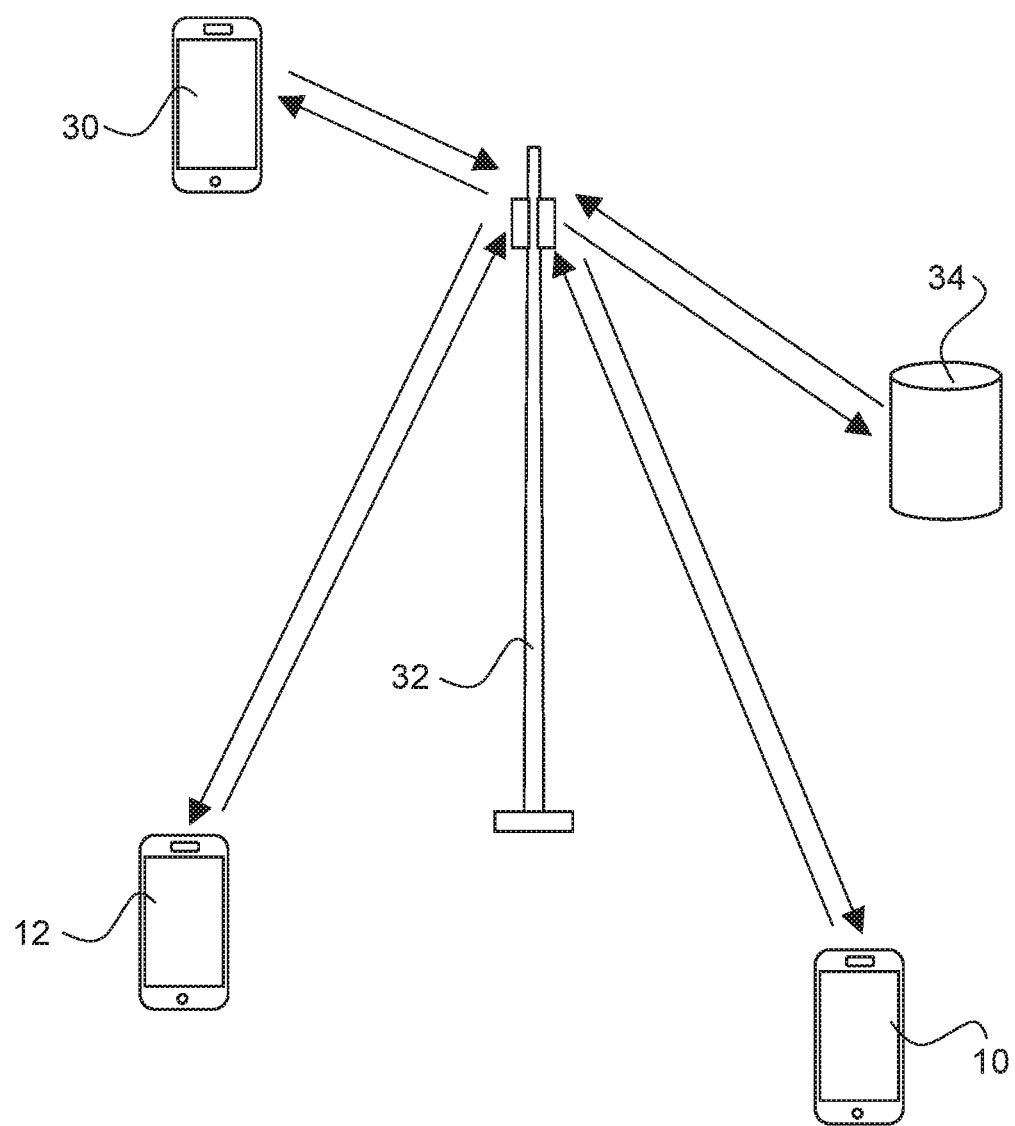

FIG. 3 shows a schematic view of three terminal devices 10, 12, and 30 communicating with each other by means of a mobile communications tower 32. The geographic positions of the terminal devices 10, 12, and 30 are determined and transmitted in a conventional manner by means of the mobile communications cells.

The three terminal devices 10, 12, and 30 are included in a database 34 in which the terminal devices 10, 12, and 30 are associated with a common communications group.

In a first step, the user of the terminal device 10 then selects a plurality of members of the communications group by selecting the mobile phone numbers of the terminal devices 12 and 30 associated with the communications group associated with the terminal devices 10, 12, and 30. After selecting the terminal devices to be queried, in the present case after selecting the terminal devices 12 and 30, the user of the terminal device 10 actuates to send the position queries to the selected terminal devices 12 and 30.

The position queries are forwarded to the database 34, in which the current geographic positions captured by the mobile communications cells are queried.

After the geographic positions of the terminal devices 10, 12, and 30 are captured by the database 34, said database calculates the current relative positions of the terminal devices 10, 12, and 30 to each other and forwards the corresponding relative position indicators to each terminal device 10, 12, and 30 in the form of distances and compass headings.

The users of the terminal devices 10, 12, and 30 can then see on the touchscreens of the terminal devices 10, 12, and 30 thereof the distance information and the compass heading of the other terminal devices 10, 12, and 30 as position indicators. Here again, the position indicators are continuously updated. The users are then guided to a common meeting point by means of the continuously updating position indicators.

If a further user of a further terminal device (not shown) is to be accepted into the communications group, then each user can select a further user from the database by means of the button 18 ("ADD+") by providing the mobile phone number of the new member of the group.

LIST OF REFERENCE NUMERALS

10 Terminal device
12 Terminal device
14 Touchscreen
16 Button "Find"

18 Button "ADD+"
20 Button "Settings"
22 Satellite
24 Distance field
26 Directional arrow
30 Terminal device
32 Mobile communications tower
34 Database

The invention claimed is:

1. A method for determining the relative positions to each other of at least two mobile terminal devices comprising a querying mobile terminal device and at least one other mobile terminal device, the method comprising:
    receiving, at a database, a relative position query from the querying mobile terminal device in a predefined communications group of mobile terminal devices, the position query requesting relative position of the at least one other mobile terminal device in the predefined communications group;
    transmitting the relative position query of the querying mobile terminal device to the other mobile terminal devices and requesting confirmation of the relative position query from the other mobile terminal devices;
    determining current geographic positions of the querying mobile device terminal and the other mobile device terminals for which relative position is requested by the querying mobile terminal and for which confirmation of the relative position query has been received;
    calculating current relative positions of the querying mobile terminal device with the other mobile terminal devices based on the current geographic positions;
    generating current relative position indicators of corresponding relative positions among the querying mobile terminal and the other mobile terminals for which confirmation of the relative position query has been received;
    forwarding corresponding ones of the current relative position indicators to each corresponding one of the querying mobile terminal and the other mobile terminals for which confirmation of the relative position query has been received; and
    displaying the corresponding current relative position indicators on at least a display of the querying mobile terminal;
    wherein the terminal devices of all users of the method are included in the database, together with an individual, user-related database associated with each mobile terminal device, wherein the mobile terminal devices are associated with individual communications groups in the database, formed by the users of the database, and wherein position queries are permitted only within each respective communications group;
    wherein all terminal devices of the users of a common communications group are displayed for selection on each terminal device of each user of the common communications group at the beginning of the position query, the user selects the terminal devices to be queried from the displayed communications group, and after selecting a position query is transmitted to all selected terminal devices to be queried; and
    wherein the transmitting to all selected terminal devices to be queried is by a single action.

2. The method according to claim 1, wherein the at least two mobile terminal devices are included with at least one further mobile terminal device in a database as a common communications group, wherein the user of the querying mobile terminal device can select one or more mobile terminal devices from the communications group for simultaneously transmitting position queries, and relative distances and geographic directions for each confirming mobile terminal device for which mobile device the users have confirmed the position queries are displayed at the queried mobile terminal device after transmitting the position queries to all selected mobile terminal devices on the basis of the relative positions to each other of each confirming mobile terminal device and the querying mobile terminal device.

3. The method according to claim 2, wherein the relative distances and geographic directions of the mobile terminal devices participating in the position query to each other are displayed at each of the mobile terminal devices participating in the position query for which the users thereof have confirmed the query, based on the current geographic positions of each of the mobile terminal devices participating in the position query.

4. The method according to claim 1, wherein based on the relative positions to each other of the mobile terminal devices a position indicator in the form of a relative distance and an opposite geographic direction to the querying mobile terminal device are also displayed at each queried mobile terminal device.

5. The method according to claim 1, wherein the position query of the querying mobile terminal device is transmitted to the queried mobile terminal device by means of a mobile communications network.

6. The method according to claim 1, wherein the current geographic positions of the mobile terminal devices participating in the position query are determined by means of a GPS system and/or by means of the mobile communications cells of at least one mobile communications network operator.

7. The method according to claim 1, wherein the current geographic positions of the mobile terminal devices are transmitted to a database, the database determines the relative positions on the basis of the current geographic positions and transmits the relative positions to the querying mobile terminal device and optionally to the at least one queried mobile terminal device.

8. The method according to claim 1, wherein the current geographic position of each of the mobile terminal devices participating in the position query, for which the user has confirmed the query, is transmitted to the querying mobile terminal device, and the processor of the querying mobile terminal device calculates the relative positions to each other of each of the mobile terminal devices participating in the position query and the querying mobile terminal device on the basis of the current geographic positions, and displays at the querying mobile terminal device the relative distance and the geographic direction as position indicators for each of the mobile terminal devices participating in the position query.

9. The method according to claim 1, wherein the position query can be declined by the user of each queried mobile terminal device.

10. The method according to claim 1, wherein in addition to the position query, a communications function is provided, by means of which the terminal devices included in the database can communicate with each other for transferring information, text messages, image files, sound files, and/or video files.

11. The method of claim 10, wherein the terminal devices are in a common communications group.

12. The method of claim 1, wherein the mobile terminal devices include at least one of mobile phones, tablet computers, PDAs, notebooks, and subnotebooks.

\* \* \* \* \*